United States Patent [19]

Harada et al.

[11] 4,250,853

[45] Feb. 17, 1981

[54] METHOD AND APPARATUS FOR CONTROLLING THE FUEL SUPPLY OF AN INTERNAL COMBUSTION ENGINE

[75] Inventors: Susumu Harada; Masakazu Ninomiya, both of Kariya, Japan

[73] Assignee: Nippondenso Co. Ltd., Kariya, Japan

[21] Appl. No.: 825,805

[22] Filed: Aug. 18, 1977

[30] Foreign Application Priority Data

Aug. 18, 1976 [JP] Japan .................................. 51/98413
Aug. 30, 1976 [JP] Japan ......................... 51/115922[U]

[51] Int. Cl.³ .............................................. F02D 31/00
[52] U.S. Cl. ..................................... 123/326; 123/493
[58] Field of Search ............... 123/102, 97 B, 32 EL, 123/32 EG, 198 DB, 119 EC, 32 EA; 261/DIG. 19

[56] References Cited

U.S. PATENT DOCUMENTS

| | | | |
|---|---|---|---|
| 2,877,998 | 3/1959 | Cornelius | 123/97 B |
| 2,879,756 | 3/1959 | Cornelius | 123/97 B |
| 3,346,771 | 10/1967 | Sutton | 123/102 |
| 3,570,460 | 3/1971 | Rabus | 123/32 EL |
| 3,690,305 | 9/1972 | Shimada | 123/102 |
| 3,762,383 | 10/1973 | Richards | 123/102 |
| 4,078,631 | 3/1978 | Kadota | 123/102 |
| 4,127,086 | 11/1978 | Harada | 123/32 EU |

*Primary Examiner*—Ronald H. Lazarus
*Attorney, Agent, or Firm*—Edwin E. Griegg

[57] ABSTRACT

A method and apparatus for controlling the fuel supply of an internal combustion engine in which the primary fuel injection valve control pulses are derived on the basis of signals from sensors which monitor various engine variables, e.g. intake air flow rate, induction tube pressure, engine speed and/or engine and air temperatures and in which the fuel supply is entirely interrupted during the condition of engine overrunning (negative output torque). After the termination of engine overrunning, the normal fuel quantity which would be supplied on the basis of prevailing sensor signals is intentionally increased for a predetermined length of time to compensate for engine cooling during overrunning. This is done by increasing the pulse length of the injection control pulses. The apparatus includes transducers and circuits for recognizing the condition of overrunning and circuitry for supplying temporarily lengthened fuel control pulses.

12 Claims, 5 Drawing Figures

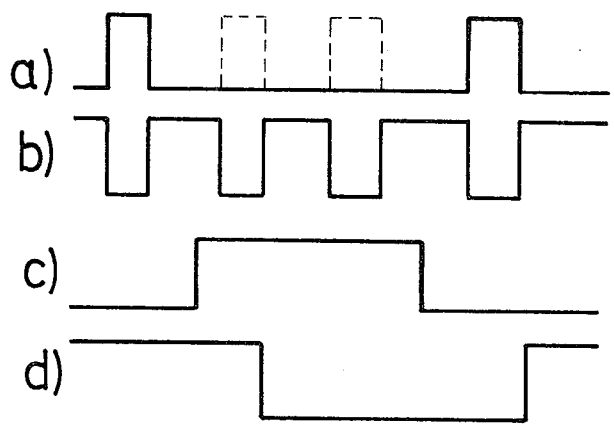
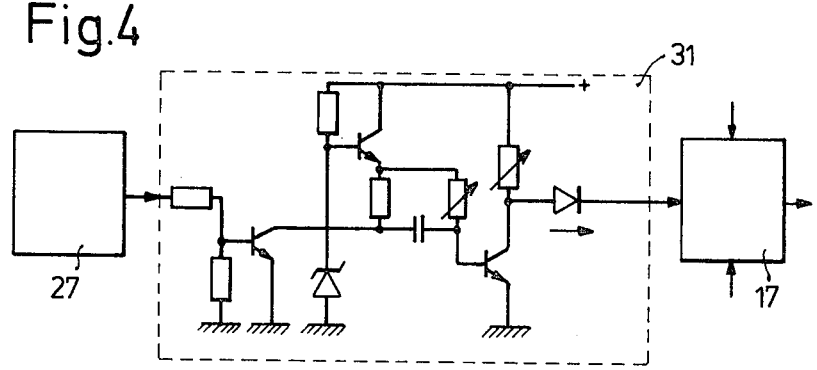
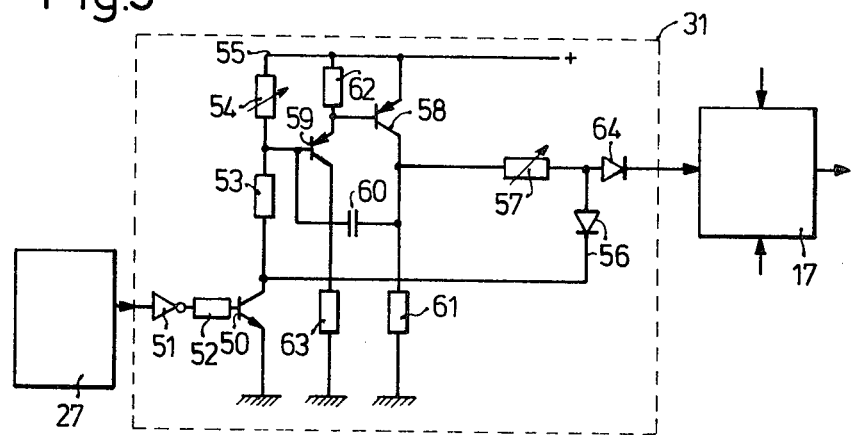

4,250,853

METHOD AND APPARATUS FOR CONTROLLING THE FUEL SUPPLY OF AN INTERNAL COMBUSTION ENGINE

BACKGROUND OF THE INVENTION

The invention relates to a fuel supply system for a motor vehicle. More particularly, the invention relates to a fuel supply system which recognizes the engine braking (overrunning) condition of the vehicle and which includes the provision for enhancing the engine braking and fuel economy by interrupting the fuel supply during that condition. When engine braking is terminated, the fuel supply is restarted and the engine is supplied with normal fuel and will respond to accelerator pedal pressure. When the fuel supply is shut off, combustion no longer takes place in the engine and, especially during prolonged engine braking, the engine will cool off considerably. The engine temperature may drop below the condensation temperature for fuel so that after fuel supply is resumed, the fuel may at least partially condense at the interior walls of the induction tube and this fact may result in an insufficient or incorrect fuel-air mixture. Engine operation with a mixture which is diminished in this way results in substantial discomfort to the driver and other disadvantages. One of these disadvantages is the incorrect exhaust gas composition due to combustion at insufficient temperature, which leaves toxic components in the exhaust gas.

OBJECT AND SUMMARY OF THE INVENTION

It is thus a principal object of the invention to provide a method and an apparatus for supplying fuel to an engine which overcomes the aforementioned disadvantages. In particular it is an object of the invention to describe a method and means for compensating for the condensation of fuel at the inner walls of the induction tube at low temperature after engine braking. It is a further object of the invention to provide a fuel supply system which insures rapid re-heating of the engine due to an increased supply of fuel after engine braking. As a result of these steps and means, there is obtained an increased driver comfort in the transition from engine braking to normal operation and the emission of toxic components in the exhaust gas is greatly reduced due to the rapid engine heating.

The invention will be better understood as well as further objects and advantages thereof become more apparent from the ensuing detailed description of three preferred embodiments taken in conjunction with the drawing.

BRIEF DESCRIPTION OF THE DRAWING

FIG. 3 is a pulse diagram describing the voltages encountered in the circuit of FIG. 2;

FIG. 4 is a circuit diagram of a second embodiment of the circuitry according to the invention; and FIG. 5 is a circuit diagram of a third embodiment of the fuel enrichment circuit according to the invention.

DESCRIPTION OF THE PREFERRED EMBODIMENTS

Figure 1:
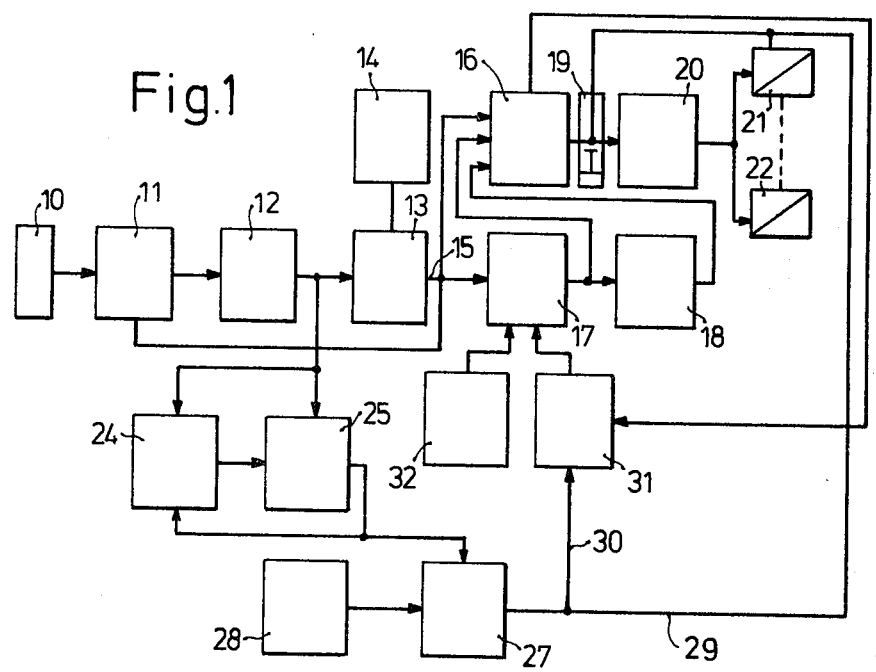
FIG. 1 is a block diagram of a fuel supply system in which the present invention is employed.

Turning now to FIG. 1, there is seen the block diagram of the electronic circuitry which is part of a fuel injection system, not shown in detail, to be used in an engine, not shown, of a motor vehicle, not shown.

The element 10 is a tacho-generator which supplies a signal related to engine rpm and whose output is connected to a pulse shaping circuit 11, a frequency divider 12 and a pulse generator circuit 13. An air flow rate sensor 14 supplies a signal to the pulse generator circuit 13. The output of the circuit 13 is connected to an OR gate 16, a correcting circuit 17 and back to the pulse shaping circuit 11. The latter connection insures that the duration of the output signal from the pulse generating circuit 13 is never greater than the duration of the pulse from the pulse shaping stage 11, as will be explained below. The OR gate 16 also receives the output signals of the correcting circuit 17 which supplies a pulse correction on the basis of signals related to engine temperature and further on the basis of signals related to a desired excess fuel quantity which represents the heart of the invention and will be described in greater detail below. The OR gate also receives the output of a voltage correcting circuit 18. Connected behind the OR gate 16 is an AND gate 19 which controls a driver circuit 20 which directly actuates the solenoid injection valves 21 and 22.

The output signal from the frequency divider 12 is fed to a monostable flip-flop 24 and to a comparator 25 and the output of the flip-flop 24 goes to a second input of the comparator 25 whose own output is returned to one of the inputs of the monostable multivibrator. The circuit further includes an engine braking recognition circuit 27 which is embodied as an AND gate receiving the output of the comparator 25 as well as a signal rom a throttle position sensor 28. The output of the engine braking recognition circuit 27 is fed via a first line 29 to the fuel cut-off circuit 19 and via a second line 30 to the excess fuel circuit 31. The excess fuel circuit 31 also receives the signal from the output of the OR gate 16 and itself delivers an output signal to the corrector circuit 17. A second input of the corrector circuit 17 receives the output of a temperature sensor 32.

The overall operation of the circuit described above is as follows:

The signals generated by the tacho-generator 10 are shaped in the pulse shaping stage 11 into a suitable form and are divided in the frequency divider 12. The output signals of the frequency divider and the signals from the air flow rate meter 14 are used in the pulse generating circuit 13, which may be of known construction, to produce fuel injection control pulses whose width is changed in the subsequent corrector circuit 17 as a function of engine temperature as well as in dependence on the desired excess fuel quantity. These pulses are further corrected in the voltage corrector circuit 18 as a function of the prevailing vehicle voltage. The OR gate 16 serves to select the longest of the pulses which are available, respectively, from the pulse generator circuit 13, the corrector circuit 17 and the voltage corrector circuit 18. The longest of these pulses is fed to the fuel shut-off circuit 19 which is an AND gate and whose output signal in turn affects the driver circuit 20 and thus serves as a control signal for the two electromagnetic injection valves 21 and 22.

The output signal of the frequency divider 12 is fed to the monostable flip-flop 24 and to the comparator 25 which performs a comparison of the length of the signals from the divider 12 and from the monostable flip-flop 24. The output signal from the comparator 25 is used to form a variable unstable time constant for the monostable flip-flop 24 and serves at the same time as one of the input signals for the engine braking recognition circuit 27. The comparator circuit 25 is built so that, if the duration of the unstable state of the monostable flip-flop 24 is smaller than the duration of the output signal of the frequency divider, the comparator produces a low level output voltage. In the opposite case, i.e., if the duration of the unstable state of the monostable multivibrator 24 is longer than the pulse width of the signal from the frequency divider 12, i.e., at high engine rpm, the comparator output is at a high potential. The duration of the unstable state of the monostable multivibrator 24 is so chosen as to correspond with that period of the frequency divider signal which is desired to be the limit at which fuel is shut off for a given throttle valve position.

When the throttle opening is less than a desired angle, the throttle valve shaft encoder 28 produces a positive signal so that the recognition circuit 27 which contains a NAND gate produces a low output if the engine speed is greater than a certain value and if, at the same time, the throttle valve angle is less than a previously determined value. In the simplest case, the throttle valve position sensor or shaft encoder 28 is embodied to generate a high, i.e., positive, signal when the throttle valve is closed, so that the recognition circuit 27 produces a low output signal when the engine rpm is greater than a certain value and the throttle valve is closed at the same time.

If the output of the engine braking recognition circuit 27 is a logical 0 (low level) this signal, which is present on the line 29, prevents the injection control signals coming from the OR gate 16 from reaching the driver circuit 20 due to the fact that the AND gate in the fuel shut-off circuit 19 is blocked. The injection valves thus receive no power and remain closed, thereby preventing fuel supply to the engine until the engine speed has dropped below a certain value and the output of the engine braking recognition circuit 27 is a logical 0 (low level).

When engine braking, i.e., overrunning, has ceased, the output of the recognition circuit 27 becomes a logical high, thereby causing the fuel shut-off circuit 19 to transmit the output signals from the OR gate 16 to the driver circuit 20 and thereby actuating the electromagnetic injection valves 21 and 22. At the same time, the increase of the voltage at the output of the engine braking recognition circuit 27 causes the fuel excess circuit 31 to engage the correcting circuit 17 to provide a prolongation of the fuel injection control pulses for a predetermined amount of time or in a predetermined number of individual injection pulses.

Figure 2:
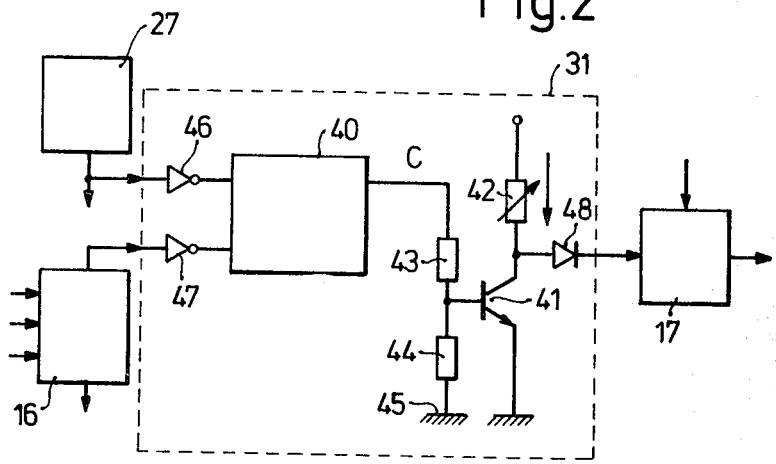
FIG. 2 is a schematic diagram of a first exemplary embodiment of the specific circuitry described by this invention.

The fuel excess control circuit 31, which is a principal element of the present invention, is illustrated in a first preferred embodiment in FIG. 2. This circuit is part of the overall block diagram of FIG. 1 and contains as a principal component a D-type flip-flop 40 of known construction and an amplifier which includes a transistor 41, a collector resistor 42 and a voltage divider composed of resistors 43 and 44 connected between the negating output of the flip-flop 40 and the ground level of the circuit. The junction of the resistors 43 and 44 is connected to the base of the transistor 41 which includes a collector resistor 42. The D input and the clock input of the flip-flop 40 are both connected through inverters 46 and 47, respectively, and the input of the inverter 46 receives the output of the previously mentioned engine braking recognition circuit 27 while the input of the inverter 47 receives the output of the OR gate 16. The collector of the transistor 31 is also connected via a diode 48 to the input of the corrector circuit 17. The function of the circuit of FIG. 2 will now be discussed in connection with the block diagram of FIG. 1 and the pulse timing diagrams in FIG. 3.

FIG. 3a illustrates the output signal of the fuel shut-off circuit 19 wherein the suppressed fuel control pulses are shown in dashed lines. FIG. 3b illustrates the inverted output signal of the OR gate 16 in the excess fuel control circuit 31. FIG. 3c is a curve illustrating the duration of engine braking and FIG. 3d shows the output signal of the fuel excess control circuit 31.

The D-type flip-flop 40 in the excess fuel control circuit 31 of FIG. 2 operates in known manner such that any signal present at the D input at the time of the positive-going edge of the next clock pulse is thereby switched through to the output. Inasmuch as the output signal from the flip-flop 40 is taken from the negating output, the next voltage level obtained there will be a logical 0 beginning with the next clock pulse which is derived from the interval between two injection control pulses. In similar manner, the output signal at the negating output of the flip-flop 40 rises again at the occurrence of the next following positive-going edge of the clock pulses at the termination of engine braking.

A low level signal at the negating output of the flip-flop 40 results in a high level signal at the output of the excess fuel control circuit 31 which causes a correction of the fuel control pulses by the corrector circuit 17 in the sense of increasing the amount of fuel injected to the engine. In the above-described practical exemplary embodiment, the amount of fuel is increased only during the very first fuel injection event which occurs after the release of the fuel injection shut-off. However, if required by the engine type or for some other reason, the excess fuel may also be provided for several injection pulses. In order to prolong the injection pulses for a predetermined length of time, there is provided a second and third embodiment of the invention, respectively illustrated in FIGS. 4 and 5, which are also to be understood in conjunction with the block diagram of FIG. 1.

Thus FIG. 4 is a circuit diagram of an excess fuel control circuit 31 including a monostable multivibrator. Whenever the output signal of the engine braking recognition circuit 27 changes value to indicate the termination of enging braking, the monostable multivibrator is flipped into its unstable state. Under those conditions, the output signal of the excess fuel control circuit 31 causes a prolongation of the control pulse supplied by the corrector circuit 17. When the unstable state of the monostable multivibrator is terminated, the latter returns to its original condition and also returns the output voltage of the excess control circuit 31 to its normal value which terminates the prolongation of the fuel injection pulses.

In FIG. 5, a principal element of the third embodiment of the invention illustrated there is a so-called Miller integrating circuit. The circuit is composed as follows: The base of a first transistor 50 receives the output of the engine braking recognition circuit 27 via an inverter 51 and a resistor 52. The emitter of the transistor 50 is grounded and its collector is connected to a positive supply line 55 via series-connected resistors 53 and 54 and, parallel thereto, through a diode 56, a resistor 57 and a further transistor 58. The junction of the resistors 53 and 54 is connected to the base of a third transistor 59 and through a capacitor 60 to the collector of the transistor 58. Also connected to the collector of this transistor 58 is a resistor 57 and a grounded resistor 61. The base of the transistor 58 leads to the emitter of the transistor 59 which is connected to the positive supply line 55 via a resistor 62 while the collector of the transistor 59 is grounded via a resistor 63. The output of the fuel excess control circuit 31 illustrated here is provided by a diode 64 whose anode is connected to the junction of the resistor 57 and the diode 56.

In the embodiment illustrated in FIG. 5, if the output of the engine braking recognition circuit 27 is at a low level, which indicates that the vehicle is operating in the overrunning, i.e., engine braking manner, and that fuel injection pulses are being suppressed, then the transistors 50, 59 and 58 all conduct. A current I10 then flows through the transistor 50 and through the resistor 57 and the diode 56. When the output of the recognition circuit 27 switches over to a high level (positive signal), the current I10 flows through the diode 64 into the corrector circuit 17. From this time on, the capacitor 60 is charged via the resistor 54 and the resistor 61. The base voltage of the transistor 59 gradually increases and the collector voltage of the transistor 58 gradually decreases. As a consequence, the current I10 flowing into the corrector circuit 17 also becomes progressively smaller. After a predetermined amount of time, the transistor 58 blocks, and the current I10 no longer flows into the corrector circuit 17. Thus it will be appreciated that, during a predetermined time, a gradually decreasing current I10 flows into the corrector circuit 17 and thus causes the increase of the fuel quantity during a well-defined length of time.

The circuits illustrated in FIGS. 4 and 5 both provide an increase of the injected fuel quantity at the termination of engine braking for a predetermined length of time. As a consequence, any possible incomplete combustion due to insufficient fuel supply is effectively prevented. The comfort of the vehicle occupants is thus maintained and an increase of toxic components in the exhaust gas is also effectively avoided.

The foregoing relates to preferred exemplary embodiments of the invention, it being understood that other embodiments and variants thereof are possible within the spirit and scope of the invention.

What is claimed and desired to be secured by letters patent of the United States is:

1. A method for controlling the fuel injection system of an internal combustion engine, comprising the steps of
    providing sensor means for generating signals related to at least one of the operational variables in the group comprising: engine speed (rpm), air flow rate through the induction tube of the engine, air pressure in the induction tube, and engine temperature;
    providing means for processing the signals from said sensor means to generate fuel injection control pulses for said fuel injection system to thereby determine the fuel quantity fed to said engine;
    sensing engine speed; determining whether the engine speed is higher or lower than a predetermined speed;
    sensing the position of an engine throttle valve corresponding to the throttle valve opening; determining whether the throttle valve opening is larger or smaller than a predetermined opening;
    an engine overrunning condition (negative output torque) when the engine speed is higher than said predetermined speed and simultaneously the throttle valve opening is smaller than said predetermined opening;
    interrupting the fuel injection for said engine when said engine is operating in the overrunning condition; and
    increasing the pulse length of said fuel injection control pulses for a predetermined time after the termination of said overrunning condition, to increase the fuel quantity fed to said engine, over the fuel quantity normally supplied, for said predetermined period of time after the termination of said overrunning condition.

2. An apparatus for controlling the fuel injection system of an internal combustion engine, said fuel injection system including:
    sensor means for generating signals related to at least one operating variable of said engine;
    pulse generating means for generating fuel injection control pulses on the basis of said signals from said sensor means;
    fuel metering means for injecting a metered quantity of fuel to said engine proportional to said fuel injection control pulses from said pulse generating means;
    transducer means for generating a signal to indicate the condition of engine overrunning (negative output torque), which includes
      timing signal generating means for generating timing output signals,
      a tacho-generator connected to said engine for generating output signals indicating engine speed,
      a comparator for comparing the output signals from said timing signal generating means with the output signals from said tacho-generator, a throttle valve position indicator and
      circuit means for indicating the simultaneous condition of the output of said comparator and the output from said throttle valve position indicator, thereby signaling said condition of engine overrunning;
    fuel shut-off means for inhibiting the injection of fuel to said engine during said condition of engine overrunning;
    electronic fuel boosting circuit means connected to said fuel injection system for providing a fuel boosting control signal for a predetermined period of time subsequent to termination of said condition of engine overrunning; and
    pulse correcting circuit means, disposed intermediate said pulse generating means and said fuel metering means and connected to receive said fuel boosting control signal, for increasing the pulse length of said fuel injection control pulses on the basis of said fuel boosting control signal, to provide an increased quantity of fuel to the engine during said predetermined period of time, to thus insure rapid re-heating of the engine subsequent to termination of said condition of engine overruning.

3. An apparatus as defined by claim 2, wherein said electronic fuel boosting circuit means includes at least one timing circuit and wherein the duration of the output signal from said timing circuit defines the period of time during which an increased amount of fuel is provided to said engine subsequent to termination of overrunning.

4. An apparatus as defined by claim 3 wherein said timing circuit is a D-type flip-flop whose data input is connected to the output of said overrunning indicator means and whose clock input is connected to the output from said pulse generating means.

5. An apparatus as defined by claim 3, further comprising circuit means with integral transfer behavior connected between said overrunning indicator means and said pulse correcting means.

6. An apparatus as defined by claim 5, wherein said circuit means with integral behavior is a monostable multivibrator.

7. An apparatus as defined by claim 2, which further comprises pulse generating means for generating fuel injection control pulses for said fuel metering means on the basis of the signals from said sensor means and pulse correcting means for correcting said fuel injection control pulses on the basis of engine information provided by said sensor means and wherein said engine information is at least one of the engine variables: engine temperature, induction air temperature and vehicle battery voltage.

8. An apparatus as defined by claim 2, wherein said fuel shut-off means is an AND gate and wherein said fuel metering means includes electronic power driver means for actuating electromagnetic injection valves in said engine, said driver means being controlled by said AND gate.

9. A method as defined by claim 1, wherein the step of increasing the fuel quantity fed to said engine provides for increasing the fuel quantity during a predetermined number of individual fuel injection control pulses.

10. A method as defined by claim 9, wherein said step of increasing the fuel quantity provides for increasing the pulse width of said fuel injection control pulses.

11. An apparatus as defined by claim 2, wherein said fuel injection system further comprises pulse generating means for generating fuel injection control pulses for said fuel metering means on the basis of said signals generated by said sensor means, and wherein the improvement further comprises pulse correcting means for adjusting said fuel injection control pulses on the basis of information from said electronic fuel boosting circuit means.

12. An apparatus as defined by claim 11, wherein said electronic fuel boosting circuit means includes at least one timing circuit and wherein the duration of the output signal from said timing circuit defines the period of time during which an increased amount of fuel is provided to said engine subsequent to termination of overrunning.

* * * * *